United States Patent
Beri

(10) Patent No.: US 12,452,321 B2
(45) Date of Patent: Oct. 21, 2025

(54) SYSTEMS FOR RESOLVING CONFLICTS IN COLLABORATIVE DIGITAL CONTENT EDITING

(71) Applicant: Adobe Inc., San Jose, CA (US)

(72) Inventor: Tarun Beri, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/140,192

(22) Filed: Apr. 27, 2023

(65) Prior Publication Data

US 2024/0137397 A1 Apr. 25, 2024
US 2024/0236160 A9 Jul. 11, 2024

Related U.S. Application Data

(63) Continuation of application No. 17/411,282, filed on Aug. 25, 2021, now Pat. No. 11,683,354.

(51) Int. Cl.
*H04L 65/401* (2022.01)
*G06F 16/176* (2019.01)

(52) U.S. Cl.
CPC ........ *H04L 65/401* (2022.05); *G06F 16/1767* (2019.01)

(58) Field of Classification Search
CPC .................. H04L 65/401; G06F 16/1767
See application file for complete search history.

(56) References Cited

U.S. PATENT DOCUMENTS

| | | |
|---|---|---|
| 6,006,239 A | 12/1999 | Bhansali et al. |
| 11,683,354 B2 | 6/2023 | Beri |
| 2008/0046828 A1 | 2/2008 | Bibliowicz et al. |
| 2013/0076773 A1* | 3/2013 | Chen .................. G06T 11/206 345/589 |
| 2014/0149857 A1* | 5/2014 | Vagell ................ G06F 40/169 715/255 |
| 2014/0280377 A1 | 9/2014 | Frew |
| 2015/0199319 A1 | 7/2015 | Newman et al. |
| 2015/0207837 A1 | 7/2015 | Guerrera et al. |
| 2015/0269033 A1 | 9/2015 | Bailor et al. |

(Continued)

OTHER PUBLICATIONS

"Non-Final Office Action", U.S. Appl. No. 17/411,282, Feb. 1, 2022, 16 pages.

(Continued)

*Primary Examiner* — Courtney Harmon

(74) *Attorney, Agent, or Firm* — FIG. 1 Patents

(57) ABSTRACT

In implementations of systems for resolving conflicts in collaborative digital content editing, a computing device implements a resolution system to apply a content editing operation to a digital object. The resolution system writes an indication of the content editing operation at a first position of a local transaction stack of editing operations. The resolution system transmits editing data via a network describing the content editing operation for receipt by a server system. Relay data is received via the network from the server system describing an additional content editing operation for application to the digital object. The resolution system determines a conflict between the additional content editing operation and the content editing operation and writes an indication of the additional content editing operation at a second position of the local transaction stack of editing operations that is before the first position.

20 Claims, 12 Drawing Sheets

(56) References Cited

U.S. PATENT DOCUMENTS

| | | | |
|---|---|---|---|
| 2015/0356116 A1* | 12/2015 | Lin | G06F 16/184 |
| | | | 707/613 |
| 2017/0177610 A1* | 6/2017 | Knotts | G06F 40/166 |
| 2017/0337254 A1 | 11/2017 | Rajbhandari et al. | |
| 2017/0364496 A1 | 12/2017 | Pak | |
| 2018/0165341 A1 | 6/2018 | Kiefer et al. | |
| 2018/0189488 A1 | 7/2018 | Arora et al. | |
| 2018/0373434 A1 | 12/2018 | Switzer et al. | |
| 2018/0373770 A1 | 12/2018 | Switzer et al. | |
| 2019/0097823 A1* | 3/2019 | Simonyi | G06F 40/197 |
| 2020/0117388 A1 | 4/2020 | Horns et al. | |
| 2020/0210231 A1 | 7/2020 | Khadilkar et al. | |
| 2020/0351111 A1* | 11/2020 | Lucco | G06F 16/2246 |
| 2021/0056233 A1* | 2/2021 | Camery | H04L 9/0822 |
| 2021/0149656 A1 | 5/2021 | Tung et al. | |
| 2021/0184878 A1 | 6/2021 | Lucco et al. | |
| 2022/0180052 A1 | 6/2022 | Yu et al. | |
| 2023/0061779 A1 | 3/2023 | Beri | |

OTHER PUBLICATIONS

U.S. Appl. No. 17/411,282, "Final Office Action", U.S. Appl. No. 17/411,282, May 19, 2022, 21 pages.

U.S. Appl. No. 17/411,282, "Final Office Action", U.S. Appl. No. 17/411,282, Dec. 22, 2022.

U.S. Appl. No. 17/411,282, "Non-Final Office Action", U.S. Appl. No. 17/411,282, Aug. 31, 2022, 23 pages.

U.S. Appl. No. 17/411,282, "Notice of Allowance", U.S. Appl. No. 17/411,282, Mar. 2, 2023, 5 pages.

Shapiro, Marc, et al., "Conflict-free Replicated Data Types", Stabilization, Safety, and Security of Distributed Systems. Lecture Notes in Computer Science, vol. 6976 [retrieved Jul. 27, 2021]. Retrieved from the Internet <https://pages.lip6.fr/Marc.Shapiro/papers/RR-7687.pdf>., 2011, 21 Pages.

Sun, David, et al., "Context-Based Operational Transformation in Distributed Collaborative Editing Systems", IEEE Transactions on Parallel and Distributed Systems, vol. 20, No. 10 [retrieved Sep. 20, 2021]. Retrieved from the Internet <https://doi.org/10.1109/TPDS.2008.240>., Oct. 2009, 17 pages.

Sun, David, et al., "Operational Transformation for Collaborative Word Processing", CSCW '04: Proceedings of the 2004 ACM conference on Computer supported cooperative work [retrieved Sep. 20, 2021]. Retrieved from the Internet <https://doi.org/10.1145/1031607.1031681>., Nov. 2004, 10 pages.

\* cited by examiner

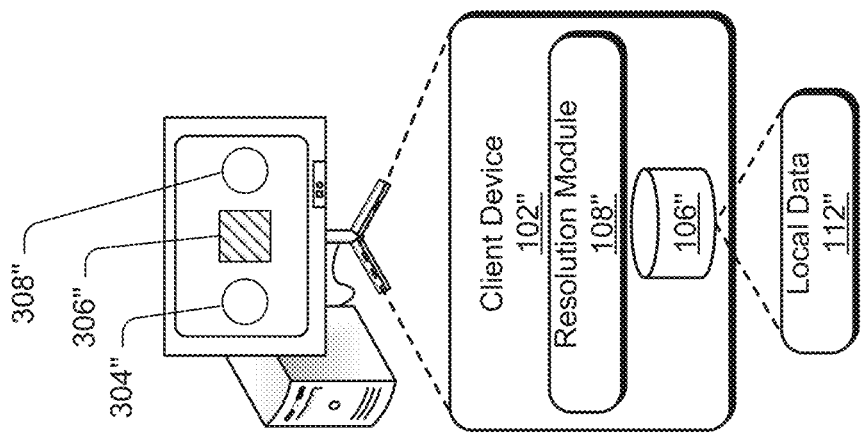
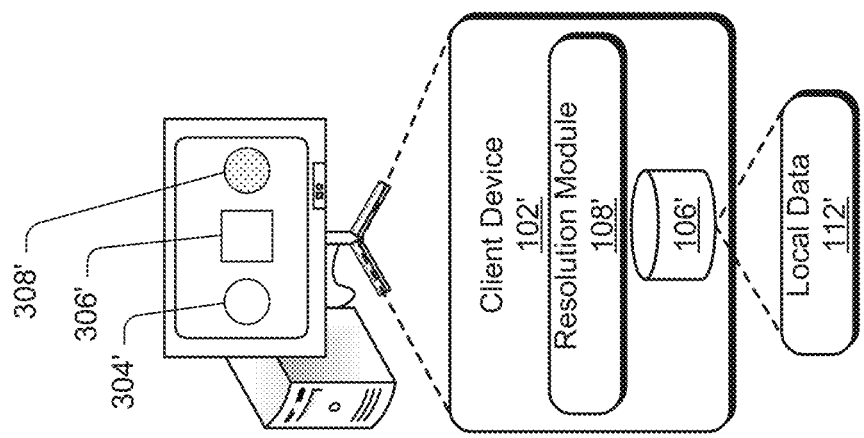
Fig. 3A
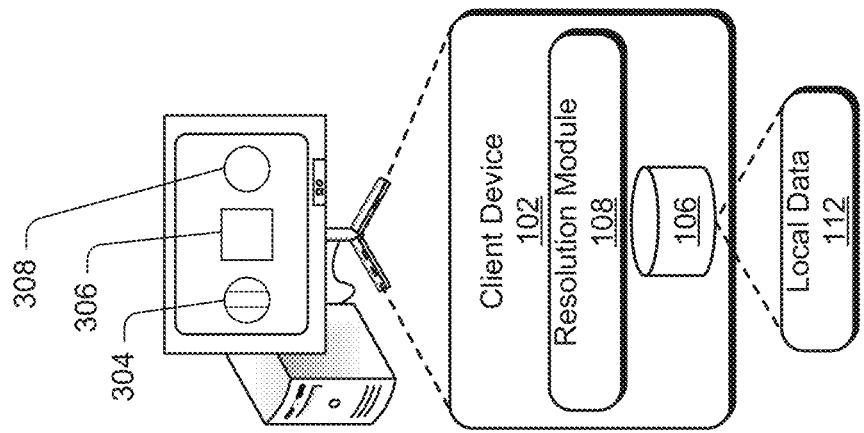

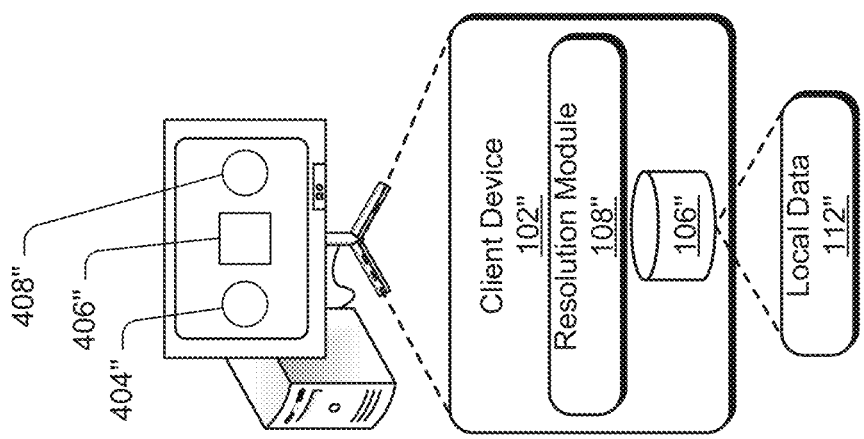
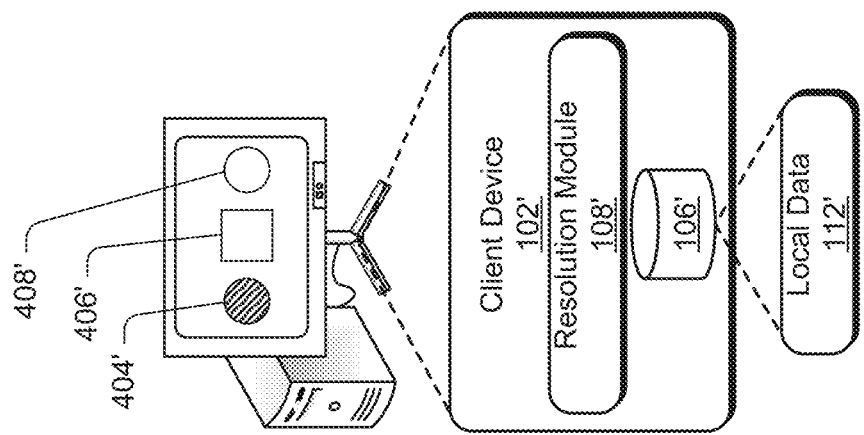
Fig. 4A
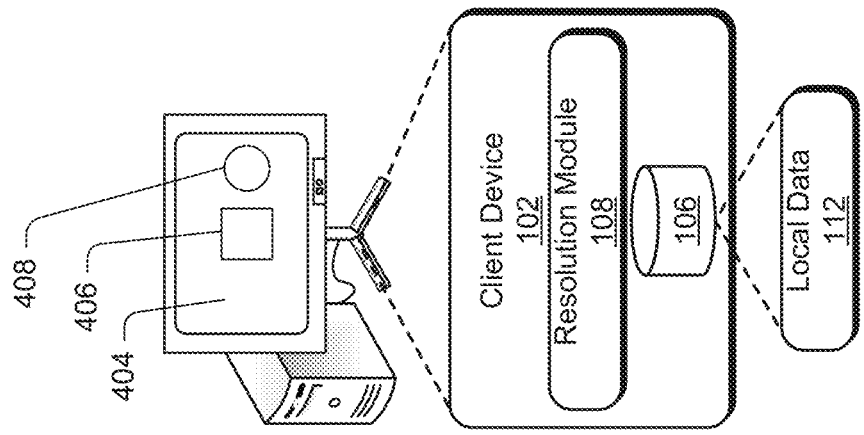

SYSTEMS FOR RESOLVING CONFLICTS IN COLLABORATIVE DIGITAL CONTENT EDITING

RELATED APPLICATIONS

This application is a continuation of and claims priority to U.S. patent application Ser. No. 17/411,282, filed Aug. 25, 2021, entitled "Systems for Resolving Conflicts in Collaborative Digital Content Editing", the entire disclosure of which is hereby incorporated by reference herein in its entirety.

BACKGROUND

In collaborative digital content editing sessions, a version of an item of digital content such as an electronic document is editable by multiple different client devices via a network simultaneously and in substantially real time. For example, a user of a first client device interacts with an input device (e.g., a mouse, a stylus, a touchscreen) relative to the first client device to add a digital object to the electronic document and a user of a second client device interacts with an input device relative to the second client device to change a background color of the electronic document. A collaboration server receives data via the network describing the content editing operations performed by the first and second client devices, and the collaboration server causes the electronic document to be modified to have the added digital object and the changed background color.

In the previous example, the added digital object and the changed background color are non-conflicting content editing operations. Consider another example in which the first client device communicates data to the collaboration server via the network describing a content editing operation that changes the background color of the electronic document from white to blue and the second client device communicates data to the collaboration server via the network describing a content editing operation that changes the background color of the electronic document from white to red. In this example, the content editing operations are conflicting because the background color of the electronic document cannot be both blue and red.

In order to resolve such conflicts, conventional systems either use editing locks which only allow one client device to perform content editing operations or a last-writer-wins conflict resolution technique. To resolve the background color conflict using the last-writer-wins technique, the collaboration server determines that the data describing the background color change from white to blue was received after the data describing the background color change from white to red was received. Based on this determination, the collaboration server causes (directly or indirectly) the electronic document to be modified to have the background color changed from white to blue because the data describing this content editing operation was received last.

However, the content editing operation that changes the background color of the electronic document from white to red is lost forever which is a limitation of conventional systems. This is particularly true because the last-writer-wins technique resolves conflicts in content editing operations arbitrarily, e.g., determines resolutions to conflicts based on network latency. Additionally, because the first content editing operation received by the collaboration server is lost, it is not possible using conventional systems to reevaluate the resolution of the conflict, for example, using a substantive metric.

SUMMARY

Techniques and systems are described for resolving conflicts in collaborative digital content editing. In an example, a computing device implements a resolution system to apply a content editing operation to a digital object in a collaborative digital content editing session. The resolution system writes an indication of the content editing operation at a first position of a local transaction stack of editing operations.

For example, the resolution system transmits editing data via a network describing the content editing operation for receipt by a server system. Relay data is received via the network from the server system describing an additional content editing operation for application to the digital object in the collaborative digital content editing session. The resolution system determines a conflict between the additional content editing operation and the content editing operation. In response to determining the conflict, the resolution system writes an indication of the additional content editing operation at a second position of the local transaction stack of editing operations that is before the first position.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A and 3B illustrate an example of non-conflicting edits as part of collaborative digital content editing.

FIGS. 4A and 4B illustrate an example of conflicting edits as part of collaborative digital content editing.

DETAILED DESCRIPTION

Overview

Figure 1:
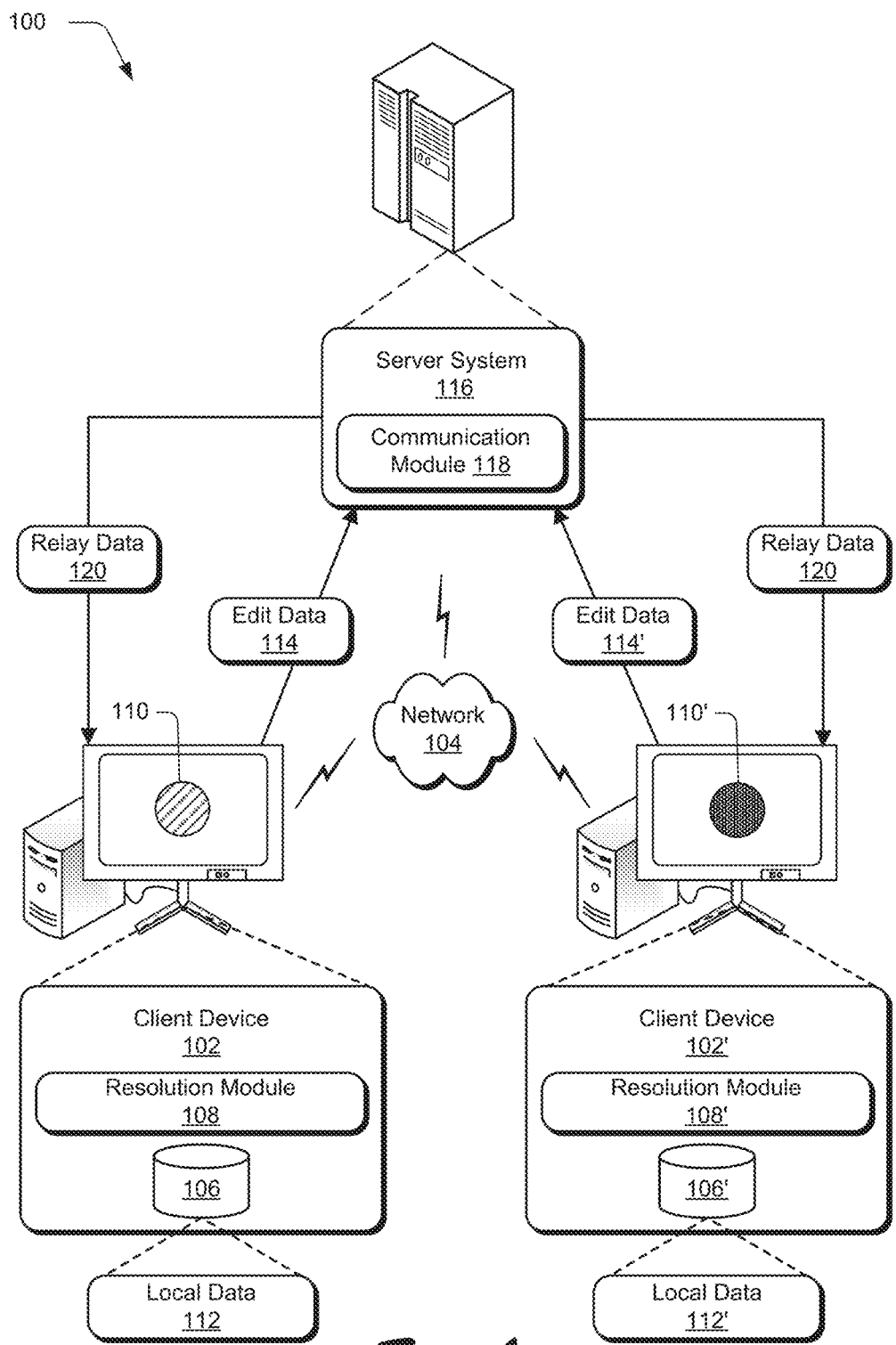
FIG. 1 is an illustration of an environment in an example implementation that is operable to employ digital systems and techniques for resolving conflicts in collaborative digital content editing as described herein.

Conventional systems for resolving conflicts in collaborative digital content editing do so using a last-writer-wins conflict resolution technique. In such conventional systems, a collaboration server receives data describing a first content editing operation and data describing a second content editing operation. The collaboration server determines that the data describing the first content editing operation was received after the data describing the second content editing operation. Based on this determination, the collaboration server first causes performance of the second content editing operation and then causes performance of the first content editing operation. However, if the first and second content editing operations are conflicting (e.g., change a same property to different values), then the second content editing operation is lost because the first content editing operation is performed last. This is a shortcoming of conventional systems since the order in which the collaboration server receives the data describing first and second content editing operations is arbitrary, for example, based on network latency which is unrelated to a substance of the content editing operations.

In order to overcome the limitations of conventional systems, techniques and systems are described for resolving conflicts in collaborative digital content editing. In one example, a computing device implements a resolution system to apply a content editing operation to a digital object in a collaborative digital content editing session. For example, the digital object is included in an electronic document that is being edited as part of the collaborative digital content editing session.

The resolution system writes an indication of the content editing operation at a most recent position of a local transaction stack of editing operations. For instance, the resolution system transmits editing data via a network describing the content editing operation for receipt by a server system. The server system receives the editing data via the network and also receives additional editing data describing an additional content editing operation for application to the digital object in the collaborative digital editing session.

In one example, the server system receives data describing editing operations and then transmits relay data describing the editing operations ordered in a same order as the data describing the editing operations is received by the server system. In this example, the server system is a passive receiver and sender of data describing editing operations performed in the collaborative digital content editing session. In other examples, the server system is capable of maintaining a record of editing operations performed as part of the collaborative digital content editing session. In some examples, the server system is also capable of applying content editing operations to a version of the electronic document that is being edited as part of the collaborative digital content editing session.

The server system determines that the additional editing data was received before the editing data was received. In this example, the server system generates relay data describing the additional content editing operation and transmits the relay data via the network for receipt by computing devices included in the collaborative digital content editing session. The resolution system receives the relay data and processes the relay data to determine a conflict between the additional content editing operation and the content editing operation. For example, the content editing operation changes a color of the digital object from red to blue and the additional content editing operation changes the color of the digital object from red to green.

In response to determining the conflict, the resolution system performs a transaction inversion on the local transaction stack of editing operations by writing an indication of the additional content editing operation at a position of the local transaction stack of editing operations that is before the most recent position. By performing the transaction inversion in this manner, the resolution system resolves the conflict between the content editing operation and the additional content editing operation because the additional content editing operation occurs before the content editing operation in the local transaction stack of editing operations.

After transmitting the relay data describing the additional content editing operation, the server system generates relay data describing the content editing operation and transmits this relay data via the network for receipt by the computing devices included in the collaborative digital content editing session. The resolution system receives the relay data and processes the relay data to identify a confirmation of the content editing operation. Unlike conventional systems in which the additional content editing operation is lost, the indication of the additional content editing operation is included in the local transaction stack of editing operations. The indication of the additional content editing operation is also included in a local transaction stack of each of the computing devices included in the collaborative digital content editing session.

Because of this improvement, the described systems are capable of recovering the additional content editing operation immediately after the conflict is identified or at any time thereafter. Accordingly, the described systems are capable of implementing a variety of different conflict resolution protocols including application specific protocols which is not possible in conventional systems that resolve conflicts solely based on an order in which conflicting editing operations are performed. This includes an ability of the described systems to delay application of certain content editing operations in the collaborative digital content editing session such as undo/redo operations as well as an ability to facilitate passive collaboration in which conflicts are resolved for groups of content editing operations.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a client device 102 connected to a network 104. The client device 102 is configurable as a desktop computer, a laptop computer, a mobile device (e.g., assuming a handheld configuration such as a tablet or mobile phone), and so forth. Thus, the client device 102 is capable of ranging from a full resource device with substantial memory and processor resources (e.g., personal computers, game consoles) to a low-resource device with limited memory and/or processing resources (e.g., mobile devices). In some examples, the client device 102 is representative of a plurality of different devices such as multiple servers utilized to perform operations "over the cloud." For example, the client device 102 is also configurable as multiple client devices in scenarios in which multiple applications share or partition computational resources of the client device 102 and each of the multiple applications is implemented as a separate client device 102.

The client device 102 includes a storage device 106 and a resolution module 108. For instance, the client device 102 implements the resolution module 108 to resolve conflicts in a collaborative digital content editing session which also includes a client device 102'. The client device 102' is also connected to the network 104 and includes a storage device 106' and a resolution module 108'. The client device 102' also implements the resolution module 108' to resolve conflicts in the collaborative digital content editing session.

In some examples, the client device 102 and the client device 102' are identical in terms of hardware and/or software but the client device 102 is disposed in first physical location and the client device 102' is disposed in a second physical location. In other examples, the client device 102 and the client device 102' are similar in terms of hardware and/or software but not identical. Although the environment 100 is illustrated to include the client device 102 and the client device 102' as part of the collaborative digital content editing session, it is to be appreciated that the collaborative digital content editing session includes many additional client devices in some examples.

Consider an example in which a user of the client device 102 interacts with an input device (e.g., a mouse, a stylus, a keyboard, a touchscreen, etc.) relative to the client device 102 to apply a first content editing operation to a local version 110 of a digital object as part of the collaborative digital content editing session. In this example, the resolution module 108 writes an indication of the first content editing operation at a most recent position of a local transaction stack of editing operations of the client device 102. For example, the local transaction stack of editing operations of the client device 102 includes indications of content editing operations performed in the collaborative digital content editing session. Local data 112 describes the local transaction stack of editing operations of the client device 102 and the storage device 106 includes the local data 112.

Continuing the previous example, a user of the client device 102' interacts with an input device relative to the client device 102' to apply a second content editing operation to a local version 110' of the digital object as part of the collaborative digital content editing session. As shown, the first content editing operation applies a first fill pattern to the local version 110 of the digital object and the second content editing operation applies a second fill pattern to the local version 110' of the digital object. The resolution module 108' writes an indication of the second content editing operation at a most recent position of a local transaction stack of editing operations of the client device 102'. The local transaction stack of editing operations of the client device 102' also includes indications of content editing operations performed in the collaborative digital content editing session. Similarly, local data 112' describes the local transaction stack of editing operations of the client device 102' and the storage device 106' includes the local data 112'.

In the illustrated example, the resolution module 108 causes the client device 102 to transmit edit data 114 via the network 104 that describes the first content editing operation for receipt by a server system 116 which is also connected to the network 104. For instance, the resolution module 108' causes the client device 102' to transmit edit data 114' via the network 104 that describes the second content editing operation for receipt by the server system 116. The server system 116 is capable of ranging from a full resource device with substantial memory and processor resources to a low-resource device with limited memory and/or processing resources. In some examples, the server system 116 is representative of a plurality of different devices such as multiple servers utilized to perform operations "over the cloud."

As shown, the server system 116 includes a communication module 118 and the server system 116 implements the communication module 118 to receive the edit data 114 and the edit data 114' via the network 104. Upon receiving the edit data 114, the server system 116 generates relay data 120 describing the edit data 114 and implements the communication module 118 to transmit the relay data 120 via the network 104 for receipt by the client device 102 and the client device 102'. Similarly, upon receiving the edit data 114', the server system 116 generates relay data 120 describing the edit data 114' and transmits the relay data 120 via the network 104 for receipt by the client device 102 and the client device 102'.

By generating and transmitting relay data 120 in this manner, the server system 116 defines a temporal order of editing operations performed as part of the collaborative digital content editing session. For example, if the server system 116 receives the edit data 114 before receiving the edit data 114', then the server system 116 generates relay data 120 describing the edit data 114 before generating relay data 120 describing the edit data 114'. Since the server system 116 transmits relay data 120 for receipt by the client device 102 and the client device 102' as the relay data 120 is generated, the client device 102 and the client device 102' receive relay data 120 describing the edit data 114 before receiving relay data 120 describing the edit data 114'. Similarly, if the server system 116 receives the edit data 114' before receiving the edit data 114, then the server system 116 generates relay data 120 describing the edit data 114' before generating relay data 120 describing the edit data 114. For instance, if the server system 116 receives the edit data 114' before receiving the edit data 114, then the client device 102 and the client device 102' receive relay data 120 describing the edit data 114' before receiving relay data 120 describing the edit data 114.

Consider an example in which the server system 116 receives the edit data 114 describing the first content editing operation before receiving the edit data 114' describing the second content editing operation. In this example, the server system 116 generates relay data 120 describing the first content editing operation and transmits the relay data 120 to the client device 102 and the client device 102'. The client device 102 receives the relay data 120 and the resolution module 108 processes the relay data 120 to identify a confirmation of the first content editing operation. The resolution module 108 does not modify the local data 112 or modifies the local data 112 to indicate that the first content editing operation is acknowledged.

Continuing this example, the client device 102' receives the relay data 120 and the resolution module 108' processes the relay data 120 to identify a conflict. For instance, the resolution module 108' determines that the first content editing operation described by the relay data 120 conflicts with the second content editing operation described by the local data 112'. In response to identifying the conflict, the resolution module 108' modifies the local data 112' by performing a transaction inversion on the local transaction stack of editing operations of the client device 102'. To do so, the resolution module 108' writes an indication of the first content editing operation at a position of the local transaction stack of editing operations described by the local data 112' that is before the position of the indication of the second content editing operation. For example, the resolution module 108' writes the indication of the first content editing operation at a position of the local transaction stack of editing operations that is before the most recent position.

In this continued example, the server system 116 generates relay data 120 describing the second content editing operation and transmits the relay data 120 to the client device 102 and the client device 102'. The client device 102 receives the relay data 120 and the resolution module 108 processes the relay data 120 and identifies the second content editing operation as a non-conflicting content operation. Accordingly, the resolution module 108 writes an indication of the second content editing operation at a position of the local transaction stack of editing operations described by the local data 112 that is after the position of the indication of the first content editing operation. Thus, the resolution module 108 writes the indication of the second content editing operation at a position of the local transaction stack of editing operations that is after the most recent position.

The client device 102' receives the relay data 120 and the resolution module 108' processes the relay data 120 to identify a confirmation of the second content editing operation. For example, the resolution module 108' does not modify the local data 112' or modifies the local data 112' to indicate that the second content editing operation is acknowledged. Accordingly, a current position of the local transaction stack of editing operations of the client device 102 includes the indication of the second content editing operation. A current position of the local transaction stack of editing of the client device 102' also includes the indication of the second content editing operation. Thus, the client device 102 and the client device 102' have reached a state of consistency.

Consider an example in which the server system 116 receives the edit data 114' describing the second content editing operation before receiving the edit data 114 describing the first content editing operation. The server system 116 generates relay data 120 describing the second content editing operation and transmits the relay data 120 to the client device 102 and the client device 102'. The client device 102 receives the relay data 120 and the resolution module 108 processes the relay data 120 to identify a conflict. For example, the resolution module 108 determines that the second content editing operation described by the relay data 120 conflicts with the first content editing operation described by the local data 112. In response to identifying the conflict, the resolution module 108 modifies the local data 112 by performing a transaction inversion on the local transaction stack of editing operations. For instance, the resolution module 108 writes an indication of the second content editing operation at a position of the local transaction stack of editing operations described by the local data 112 that is before the position of the indication of the first content editing operation. For example, the resolution module 108 writes the indication of the second content editing operation at a position of the local transaction stack of editing operations that is before the most recent position.

Continuing the previous example, the computing device 102' receives the relay data 120 and the resolution module 108' processes the relay data 120 to identify a confirmation of the second content editing operation. For example, the resolution module 108' does not modify the local data 112' or modifies the local data 112' to indicate that the second content editing operation is acknowledged. The server system 116 generates relay data 120 describing the first content editing operation and transmits the relay data 120 to the client device 102 and the client device 102'

The client device 102 receives the relay data 120 describing the first content editing operation and the resolution module 108 processes the relay data to identify a confirmation of the first content editing operation. For instance, the resolution module 108 does not modify the local data 112 or modifies the local data 112 to indicate that the first content editing operation is acknowledged. The client device 102' receives the relay data 120 and the resolution module 108' processes the relay data 120 and identifies the first content editing operation as a non-conflicting content operation. Thus, the resolution module 108' writes an indication of the first content editing operation at a position of the local transaction stack of editing operations described by the local data 112' that is after the position of the indication of second content editing operation. Thus, the resolution module 108' writes the indication of the first content editing operation at a position of the local transaction stack of editing operations that is after the most recent position.

Accordingly, a current position of the local transaction stack of editing operations of the client device 102 includes the indication of the first content editing operation. A current position of the local transaction stack of editing of the client device 102' also includes the indication of the first content editing operation. Thus, the client device 102 and the client device 102' have reached a state of consistency.

Although described as conflicting content editing operations applied to a digital object, it is to be appreciated that such conflicts are equally possible in content editing operations applied to digital layers, digital artboards, digital documents, and so forth. It is also to be appreciated that conflicts are definable at any granularity as part of creating and/or editing digital content. Further, while two conflicting content editing operations are described, it is to be appreciated that many conflicting content editing operations are equally possible to resolve by performing transaction inversions on local transaction stacks of editing operations.

By processing the relay data 120 to identify a conflicting content editing operation and resolving the identified conflict by writing an indication of the conflicting content editing operation at a position of a local transaction stack that is before a most recent position of the local transaction stack, the resolution module 108 and the resolution module 108' are capable of implementing a variety of different conflict resolution protocols. Examples of these different conflict resolution protocols include rule based protocols which are customizable for specific applications, ownership based protocols which resolve conflicts in favor of a designated owner, bulk resolution protocols which resolve multiple conflicts simultaneously, order based protocols such as a first or a last edit wins, and so forth.

Additionally, because the server system 116 generates the relay data 120 as describing indications of content editing operations described by the edit data 114 and the edit data 114', the local transaction stack described by the local data 112 and the local transaction stack described by the local data 112' each include a history of all conflicting editing operations as part of the collaborative digital content editing session. This includes conflicting editing operations which are not based on content editing operations described by the edit data 114 or the edit data 114'. Further, since both the local data 112 and the local data 112' describe all conflicting editing operations as part of the collaborative digital content editing session, these conflicts are resolvable when the conflicts occur or anytime thereafter using any conflict resolution protocol or combinations of conflict resolution protocols.

Although the server system 116 is described as receiving edit data 114 and transmitting relay data 120 as part of a collaborative digital content editing session, in some examples, the server system 116 is also capable of maintaining a record of content editing operations performed during the collaborative digital content editing session. For example, the server system 116 uses this record to facilitate an addition of a client device to a collaborative digital content editing session which includes multiple previous edits to an item of digital content performed by other client devices before the addition of the client device. In one example, the server system 116 performs content editing operations to a version of an item of digital content that is being edited as part of a collaborative digital content editing session.

Although examples in which the local data 112 describes a local transaction stack of editing operations are discussed, it is to be appreciated that the described systems are not limited to use of a local transaction stack of editing operations for resolving conflicts in collaborative digital content editing. For example, the local data 112 describes a local accompanying buffer or a different history buffer and transaction inversions are performed on the local accompanying buffer or the different history buffer to resolve conflicting content editing operations. In one example, the local data 112 describes any data structure or buffer of remote operations. In another example, the local data 112 describes any data structure or buffer of all operations.

Figure 2:
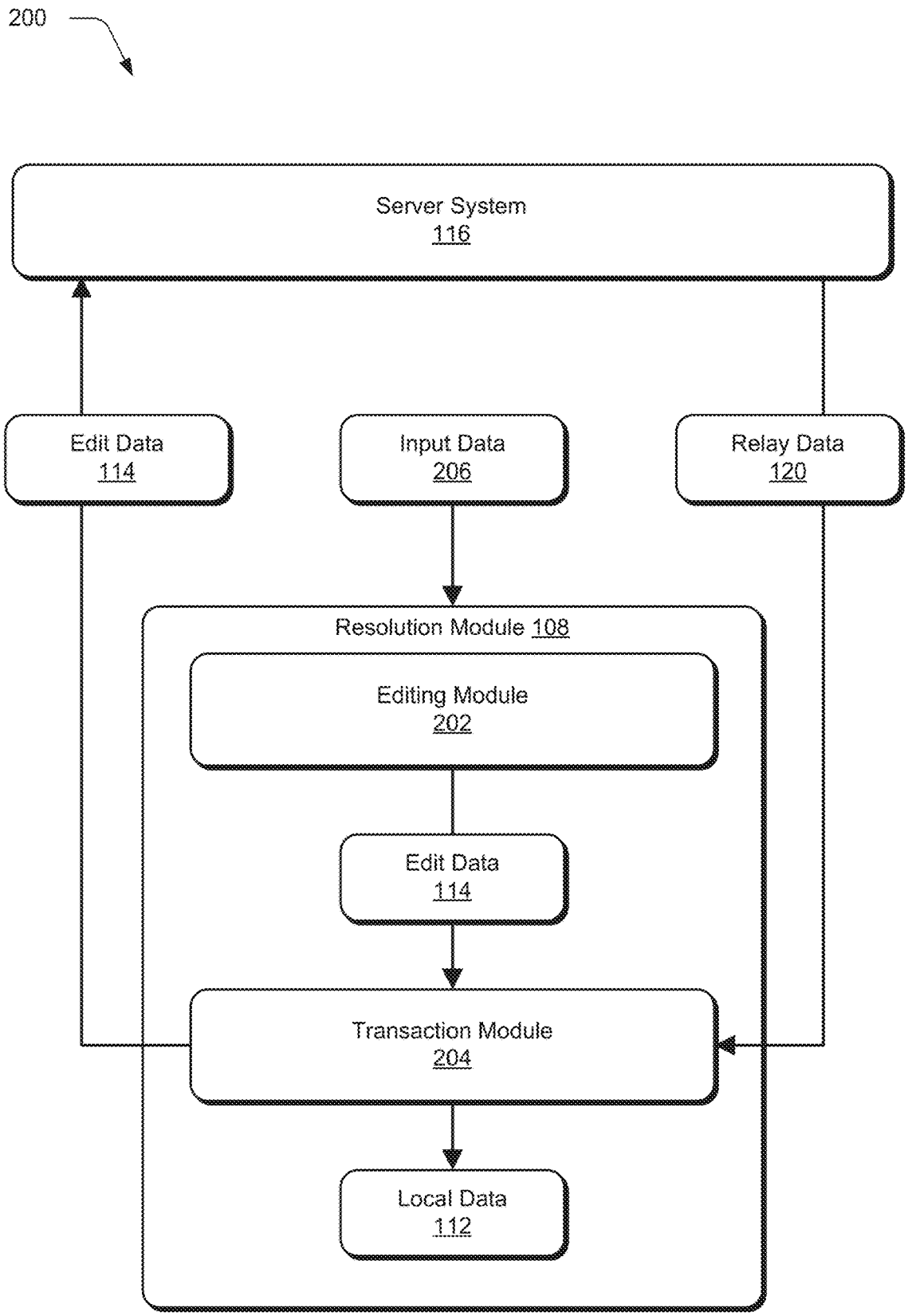
FIG. 2 depicts a system in an example implementation showing operation of a resolution module for resolving conflicts in collaborative digital content editing.

FIG. 2 depicts a system 200 in an example implementation showing operation of a resolution module 108. The resolution module 108 is illustrated to include an editing module 202 and a transaction module 204. As shown, the editing module 202 receives input data 206 describing a user input as part of a collaborative digital content editing session. For example, a user of the client device 102 interacts with an input device (e.g., a touchscreen, a mouse, a stylus, a keyboard, a microphone, etc.) relative to a user interface of the client device 102 to perform a digital content editing operation on a local version of digital content being edited as part of the collaborative digital content editing session, and the input device generates the input data 206.

The editing module 202 receives and processes the input data 206 to generate edit data 114 describing an indication of the content editing operation performed on the local version of the digital content. The transaction module 204 receives the edit data 114 and processes the edit data 114 to identify the indication of the content editing operation. The transaction module 204 accesses local data 112 describing a local transaction stack of editing operations. For instance, the transaction module 204 modifies the local data 112 by writing the indication of the content editing operation at a most recent position of the local transaction stack of editing operations described by the local data 112.

The transaction module 204 transmits the edit data 114 to a server system 116 via a network 104. The server system 116 receives the edit data 114 describing the content editing operation and the server system 116 also receives other edit data describing other content editing operations. The server system 116 determines a first received content editing operation from the other content editing operations and the content editing operation. For instance, the server system 116 generates relay data 120 describing an indication of the first received content editing operation and transmits the relay data 120 to the transaction module 204 via the network 104.

As shown in FIG. 2, the transaction module 204 receives the relay data 120 and processes the relay data 120 to compare the indication of the first received content editing operation and the indication of the content editing operation described by the local data 112. In a first example, the transaction module 204 determines that the indication of the first received content editing operation is a confirmation of the content editing operation. In this first example, the transaction module 204 does not modify the local data 112 or the transaction module 204 modifies the local data 112 to indicate that the content editing operation is acknowledged. In a second example, the transaction module 204 determines that the indication of the first received content editing operation is a non-conflicting content editing operation or an invalid content editing operation. In this second example, the transaction module 204 modifies the local data 112 by writing an indication of the non-conflicting or invalid content editing operation at a position of the local transaction stack of editing operations described by the local data 112 that is after the most recent position.

In a third example, the transaction module 204 determines that the indication of the first received content editing operation is a conflicting content operation with the content editing operation described by the local data 112. In this third example, the transaction module 204 modifies the local data 112 by writing an indication of the conflicting content editing operation at a position of the local transaction stack that is before the most recent position of the local transaction stack. By writing the indication of the conflicting content editing operation at a position described by the local data 112 that is before the most recent position described by the local data 112, the transaction module 204 resolves the conflict between the content editing operation and the conflicting content editing operation because the conflicting content editing operation is before the content editing operation in the local transaction stack.

FIGS. 3A and 3B illustrate an example of non-conflicting edits as part of collaborative digital content editing. FIG. 3A illustrates a representation 300 of client devices in a collaborative digital content editing session. FIG. 3B illustrates a representation 302 of local transaction stacks of the client devices in the collaborative digital content editing session.

As shown in FIG. 3A, the representation includes client devices 102, 102', and 102". The client device 102 includes a storage device 106 and a resolution module 108. The storage device 106 is illustrated to include local data 112 describing a local transaction stack of editing operations for the client device 102. Similarly, the client device 102' includes a storage device 106' and a resolution module 108', and the storage device 106' includes local data 112' describing a local transaction stack of editing operations for the client device 102'. The client device 102" includes a storage device 106" and a resolution module 108". The storage device 106" is illustrated to include local data 112" that describes a local transaction stack of editing operations for the client device 102".

The client device 102 is capable of editing a local version 304 of a first digital object, a local version 306 of a second digital object, and a local version 308 of a third digital object. As shown, the client device 102' is capable of editing a local version 304' of the first digital object, a local version 306' of the second digital object, and a local version 308' of the third digital object. Similarly, the client device 102" is capable of editing a local version 304" of the first digital object, a local version 306" of the second digital object, and a local version 308" of the third digital object.

A user of the client device 102 interacts with an input device to apply a first content editing operation to the local version 304 of the first digital object and a user of the client device 102' interacts with an input device to apply a second content editing operation to the local version 308' of the third digital object. As shown, a user of the client device 102" interacts with an input device to apply a third content editing operation to the local version 306" of the second digital object. For example, the resolution module 108 writes an indication of the first content editing operation at a most recent position described by the local data 112 and transmits edit data 114 describing the first content editing operation to the server system 116 via the network 104. In this example, the resolution module 108' writes an indication of the second content editing operation at a most recent position described by the local data 112' and transmits edit data 114' describing the second content editing operation to the server system 116 via the network 104. For instance, the resolution module 108" writes an indication of the third content editing operation at a most recent position described by the local data 112" and transmits edit data 114" describing the third content editing operation to the server system 116 via the network 104.

With reference to FIG. 3B, the representation 302 includes the client device 102, the client device 102', and the client device 102". The representation 302 also includes a local transaction stack 310 of the client device 102 described by the local data 112, a local transaction stack 310' of the client device 102' described by the local data 112', and a local transaction stack 310" of the client device 102" described by the local data 112". Contents of the local transaction stacks 310, 310', and 310" are illustrated at times T0 312 through T4 320. At T0 312, the local transaction stack 310, the local transaction stack 310', and the local transaction stack 310" are empty and a state of a document that includes the first 304, second 306, and third 308 digital objects is the same for the client device 102, the client device 102', and the client device 102".

At T1 314, the client device 102 applies the first content editing operation to the local version 304 of the first digital object; the client device 102' applies the second content editing operation to the local version 308' of the third digital object; and the client device 102" applies the third content editing operation to the local version 306" of the second digital object. As shown in the representation, the resolution module 108 writes an indication 322 of the first content editing operation at a most recent position of the local transaction stack 310; the resolution module 108' writes an indication 324 of the second content editing operation at a most recent position of the local transaction stack 310'; and the resolution module 108" writes an indication 326 of the third content editing operation at a most recent position of the local transaction stack 310". For example, the server system 116 receives edit data 114' describing the second content editing operation first, edit data 114 describing the first content editing operation second, and edit data 114" describing the third content editing operation third. The server system 116 generates relay data 120 describing the indication 324 and transmits the relay data 120 to the client device 102, the client device 102', and the client device 102" via the network.

At T2 316, the client device 102, the client device 102', and the client device 102" receive the relay data 120 describing the indication 324. Since the indication 324 does not conflict with the indication 322, the resolution module 108 writes the indication 324 at a position of the local transaction stack 310 after the position of the indication 322. For example, the resolution module 108' identifies the indication 324 as a confirmation or an acknowledgement of the second content editing operation and does not modify the local data 112' or modifies the local data 112' to indicate that the second content editing operation is confirmed or acknowledged. Since the indication 324 does not conflict with the indication 326, the resolution module 108" writes the indication 324 at a position of the local transaction stack 310" after the position of the indication 326.

At T3 318, the client device 102, the client device 102', and the client device 102" receive relay data 120 describing the indication 322. For instance, the resolution module 108 identifies the indication 322 as a confirmation or an acknowledgement of the first content editing operation and does not modify the local data 112 or modifies the local data 112 to indicate that the first content editing operation is confirmed or acknowledged. Since the client device 102' has no unacknowledged content editing operations, the resolution module 108' writes the indication 322 at a position of the local transaction stack 310' after the position of the indication 324. Because the indication 322 also does not conflict with the indication 326, the resolution module 108" writes the indication 322 at a position of the local transaction stack 310" after the position of the indication 324.

At T4 320, the client device 102, the client device 102', and the client device 102" receive relay data 120 describing the indication 326. Since the client device 102 has no unacknowledged content editing operations, the resolution module 108 writes the indication 326 at a position of the local transaction stack 310 after the position of the indication 324. Because the client device 102' also has no unacknowledged content editing operations, the resolution module 108' writes the indication 326 at a position of the local transaction stack 310' after the position of the indication 322. For instance, the resolution module 108" identifies the indication 326 as a confirmation or an acknowledgement of the third content editing operation and does not modify the local data 112" or modifies the local data 112" to indicate that the third content editing operation is confirmed or acknowledged.

Figure 4B:
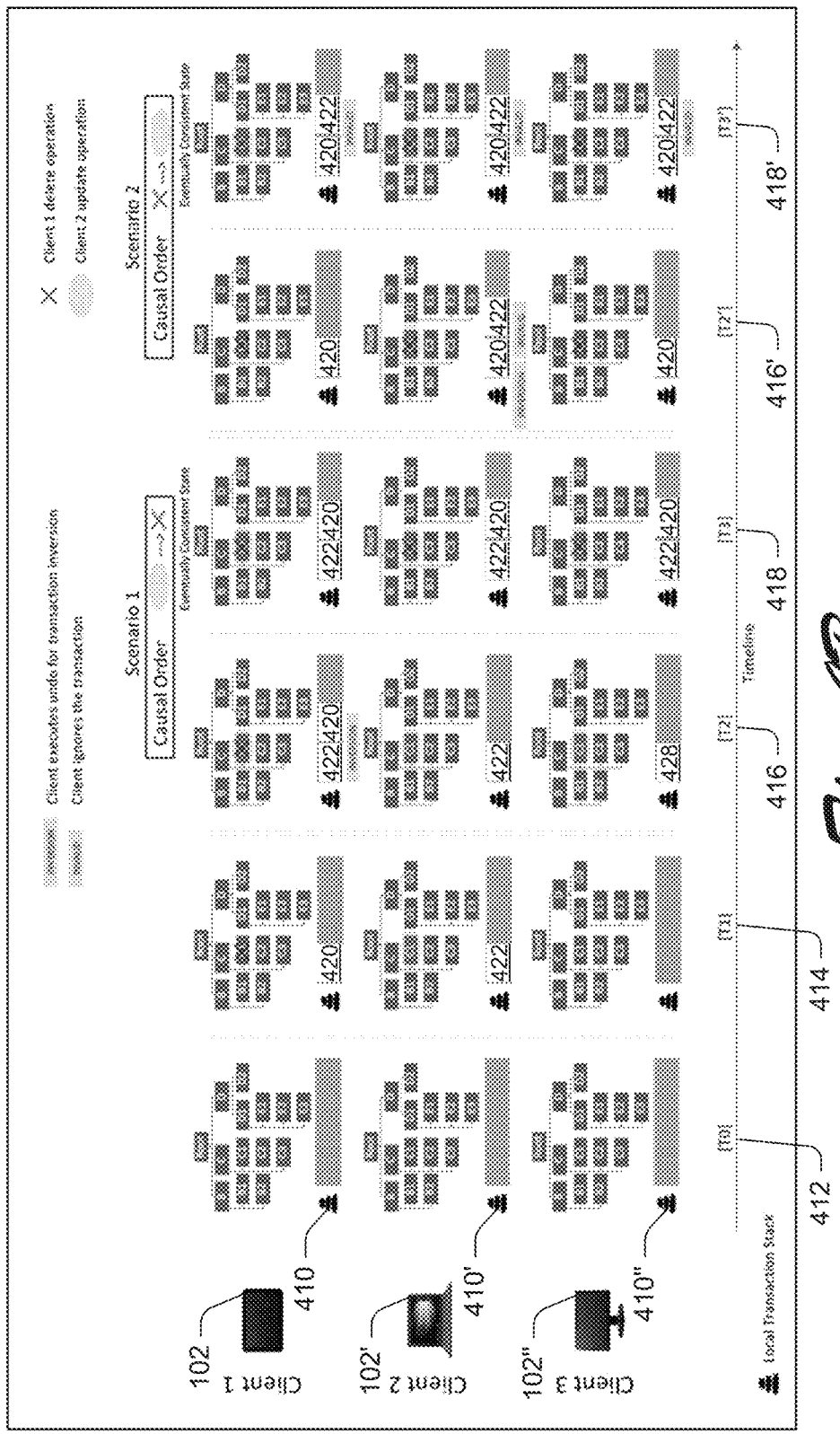

FIGS. 4A and 4B illustrate an example of conflicting edits as part of collaborative digital content editing. FIG. 4A illustrates a representation 400 of client devices in a collaborative digital content editing session. FIG. 4B illustrates a representation 402 of local transaction stacks of the client devices in the collaborative digital content editing session. As shown in the representation 400, client device 102 is capable of editing a local version 404 of a first digital object, a local version 406 of a second digital object, and a local version 408 of a third digital object; client device 102' is capable of editing a local version 404' of the first digital object, a local version 406' of the second digital object, and a local version 408' of the third digital object; and client device 102" is capable of editing a local version 404" of the first digital object, a local version 406" of the second digital object, and a local version 408" of the third digital object.

With respect to FIG. 4B, the representation 402 includes a local transaction stack 410 for the client device 102; a local transaction stack 410' for the client device 102'; and a local transaction stack 410" for the client device 102". Contents of the local transaction stacks 410, 410', and 410" are illustrated at times T0 412 through T3 418 and also at times T0 412 through T3' 418'. At T0 412, the local transaction stack 410, the local transaction stack 410', and the local transaction stack 410" are empty and a state of a document that includes the first 404, second 406, and third 408 digital objects is the same for the client device 102, the client device 102', and the client device 102".

At T1 414, the client device 102 performs a delete operation on the local version 404 of the first digital object. The resolution module 108 writes an indication 420 of the delete operation at a most recent position of the local transaction stack 410. For example, the client device 102' performs a content editing operation on the local version 404' of the first digital object. For instance, the resolution module 108' writes an indication 422 of the content editing operation at a most recent position of the local transaction stack 410'. The client device 102" performs no content editing operations and the resolution module 108" does not modify the local data 112".

The server system 116 receives edit data 114 describing the delete operation and edit data 114' describing the content editing operation. At T2 416, the server system 116 generates relay data 120 describing the content editing operation because the server system 116 received the edit data 114' before receiving the edit data 114. At T2' 416', the server system 116 generates relay data 120 describing the delete operation because the server system 116 received the edit data 114 before receiving the edit data 114'.

At T2 416, the client device 102, the client device 102', and the client device 102" receive the relay data 120 describing the content editing operation. Since the content editing operation conflicts with the delete operation, the resolution module 108 performs a transaction inversion on the local transaction stack 410 described by the local data 112 and writes the indication 422 of the content editing operation in the local transaction stack 410 at a position that is before the position of the indication 420 of the delete operation. In an example, this resolves the conflict between the content editing operation and the delete operation. The resolution module 108' identifies the indication 422 as a confirmation or an acknowledgement of the content editing operation and does not modify the local data 112' or modifies the local data 112' to indicate that the content editing operation is confirmed or acknowledged. Since the client device 102" has no unacknowledged content editing operations, the resolution module 108" writes the indication 422 at a most recent position of the local transaction stack 410".

At T3 418, the client device 102, the client device 102', and the client device 102" receive relay data 120 describing the delete operation. The resolution module 108 identifies the indication 420 as a confirmation or an acknowledgement of the delete operation and does not modify the local data 112 or modifies the local data 112 to indicate that the delete operation is confirmed or acknowledged. Since the client device 102' has no unacknowledged content editing operations, the resolution module 108' writes the indication 420 at a position of the local transaction stack 410' that is after the position of the indication 422 of the content editing operation. Because the client device 102" has no unacknowledged content editing operations, the resolution module 108" writes the indication 420 at a position of the local transaction stack 410" that is after the position of the indication 422 of the content editing operation.

At T2' 416', the client device 102, the client device 102', and the client device 102" receive the relay data 120 describing the delete operation. As shown, the resolution module 108 identifies the indication 420 as a confirmation or an acknowledgement of the delete operation and does not modify the local data 112 or modifies the local data 112 to indicate that the delete operation is confirmed or acknowledged. Since the delete operation conflicts with the content editing operation, the resolution module 108' performs a transaction inversion on the local transaction stack 410' described by the local data 112' and writes the indication 420 of the delete operation in the local transaction stack 410' at a position that is before the position of the indication 422 of the content editing operation.

For example, this partially resolves the conflict between the delete operation and the content editing operation. In this example, the resolution module 108' completely resolves this conflict by marking the indication 422 of the content editing operation as invalid in the local transaction stack 410'. Since the client device 102" has no unacknowledged content editing operations, the resolution module 108" writes the indication 420 at a most recent position of the local transaction stack 410".

Consider other examples in which the resolution module 108' is capable of completely resolving the partially resolved conflict between the delete operation and the content edition operation in addition to marking the indication of the content operation as invalid. For instance, the resolution module 108' is capable of flagging the indication 422 of the content editing operation in the local transaction stack 410'. In another example, the resolution module 108' dynamically determines validity of an underlying object while undo/redo operations are performed or executed. In this example, rather than explicitly marking the indication 422 of the content editing operation as invalid, the resolution module 108' checks for existence/validity of objects while applying operations (e.g., during undo, redo, etc.) and dynamically determines that the indication 422 of the content editing operation is invalid.

At T3' 418', the client device 102, the client device 102', and the client device 102" receive relay data 120 describing the content editing operation. The resolution module 108 identifies the indication 422 as a normal update and writes the indication 422 in a position of the local transaction stack 410 that is after the position of the indication 420. However, since the local version 404 of the first digital object has been deleted, the resolution module 108 marks the indication 422 as invalid in the local transaction stack 410.

In one example, the resolution module 108' identifies the indication 422 as a confirmation or an acknowledgement of the content editing operation (which is invalid) and does not modify the local data 112'. Since the client device 102" has no unacknowledged content editing operations, the resolution module 108" writes the indication 422 at a position of the local transaction stack 410" that is after the position of the indication 420. Because the local version 404" of the first digital object has been deleted, the resolution module 108" marks the indication 422 as invalid in the local transaction stack 410".

Figure 5B:
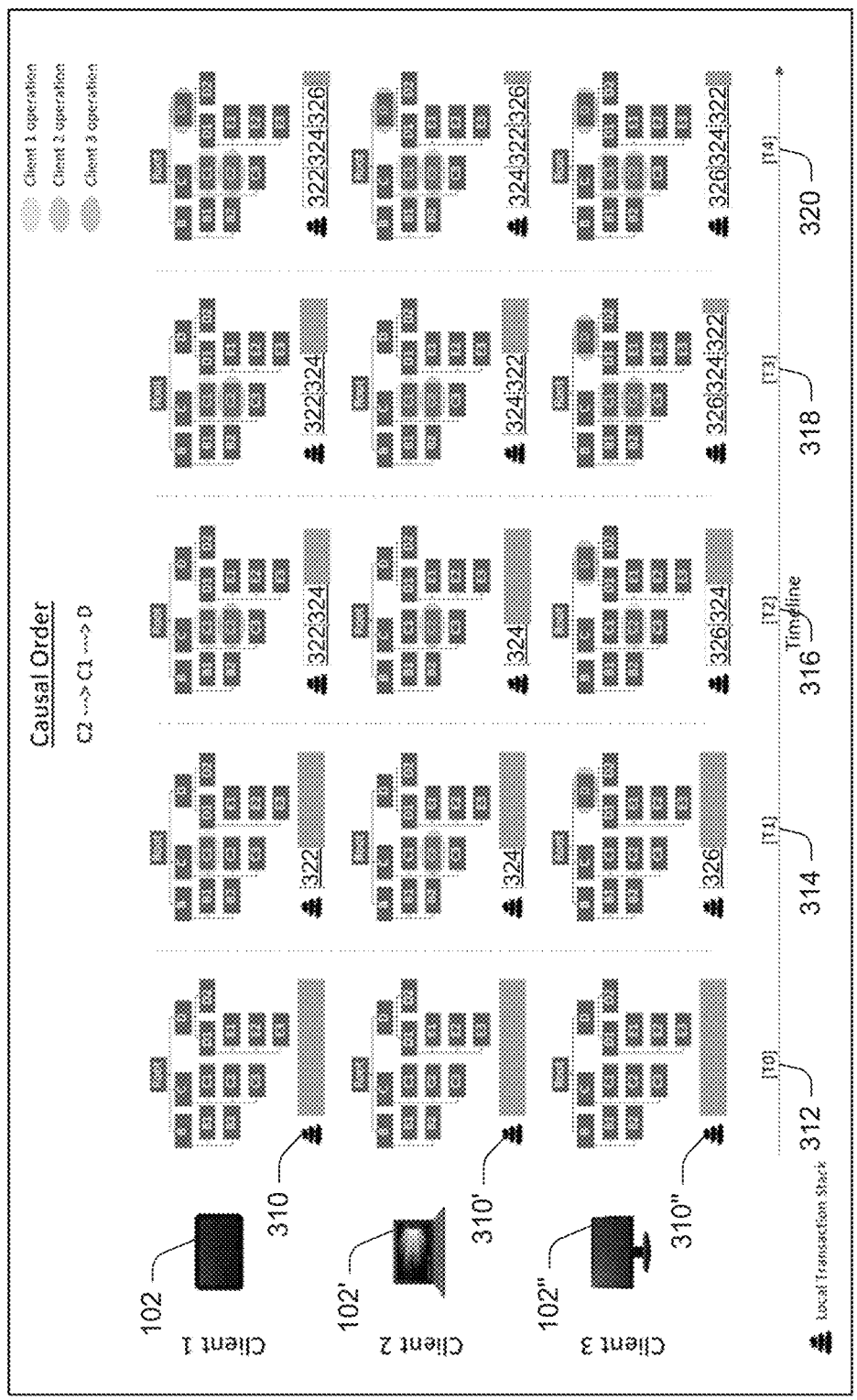
FIGS. 5A and 5B illustrate an example of receiving conflicting edits after performing additional local content editing operations.
Figure 5A:
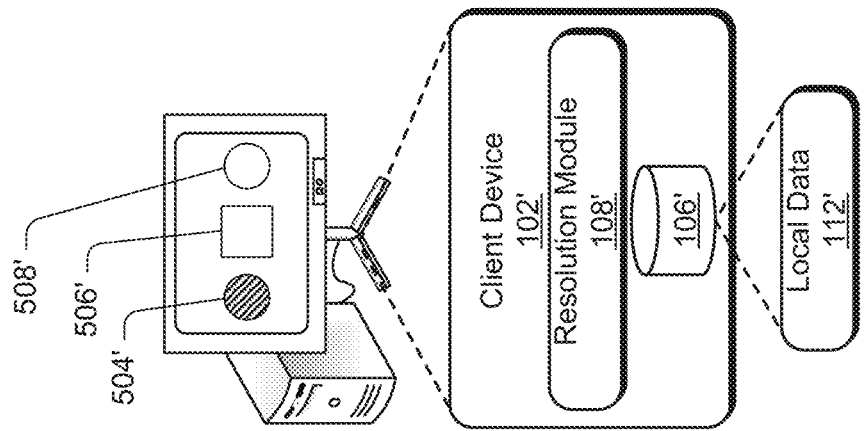
Figure 5A:
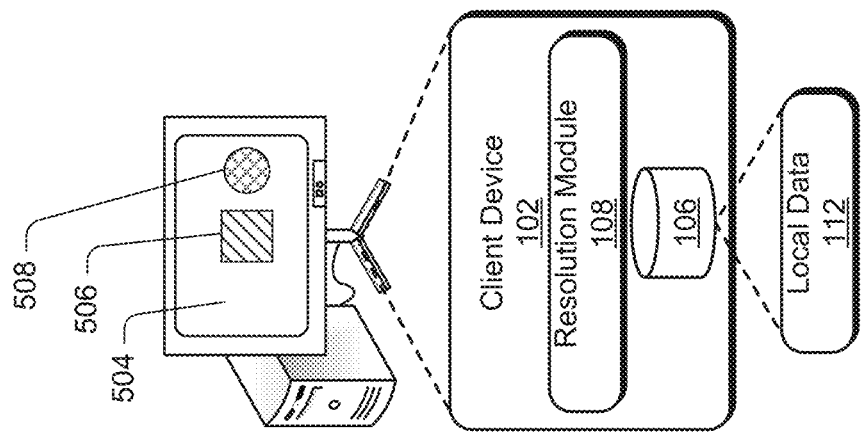
Figure 5B:
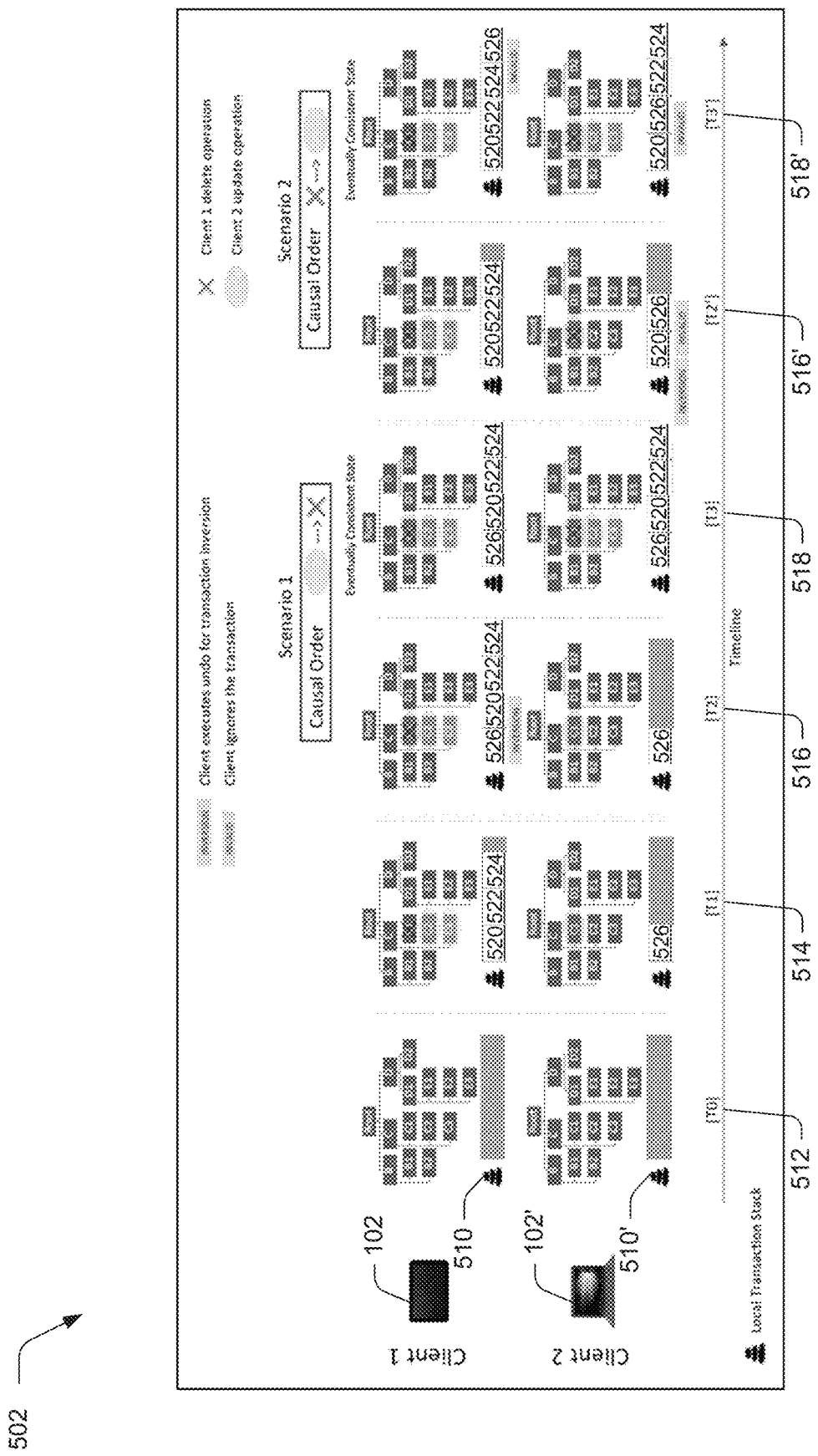

FIGS. 5A and 5B illustrate an example of receiving conflicting edits after performing additional local content editing operations. FIG. 5A illustrates a representation 500 of client devices in a collaborative digital content editing session. FIG. 5B illustrates a representation 502 of local transaction stacks of the client devices in the collaborative digital content editing session. As illustrated in the representation 500, client device 102 is capable of editing a local version 504 of a first digital object, a local version 506 of a second digital object, and a local version 508 of a third digital object. For example, client device 102' is capable of editing a local version 504' of the first digital object, a local version 506' of the second digital object, and a local version 508' of the third digital object. As shown, the client device 102 performs a delete operation on the local version 504 of the first digital object, applies a first content editing operation to the local version 506 of the second digital object, and applies a second content editing operation to the local version 508 of the third digital object. For instance, the client device 102' applies a third content editing operation to the local version 504' of the first digital object.

With respect to FIG. 5B, the representation 502 includes a local transaction stack 510 for the client device 102 and a local transaction stack 510' for the client device 102'. Contents of the local transaction stacks 510, 510' are illustrated at times T0 512 through T3 518 and also at times T0 512 through T3' 518'. At T0 512, the local transaction stack 510 and the local transaction stack 510' are empty and a state of a document that includes the first 504, second 506, and third 508 digital objects is the same for the client device 102 and the client device 102'.

At T1 514, the resolution module 108 writes an indication 520 of the delete operation at a most recent position of the local transaction stack 510, an indication 522 of the first content editing operation at a position of the local transaction stack 510 that is after the position of the indication 520, and an indication 524 of the second content editing operation at a position of the local transaction stack 510 that is after the position of the indication 522. For example, the resolution module 108' writes an indication 526 of the third content editing operation at a most recent position of the local transaction stack 510'. At T2 516, the server system 116 generates relay data 120 as describing the third content editing operation because the server system 116 receives edit data 114' describing the third content editing operation before receiving edit data 114 describing the delete operation, the first content editing operation, and the second content editing operation. At T2' 516', the server system 116 generates relay data 120 as describing the delete operation, the first content editing operation, and the second content editing operation because the server system 116 receives edit data 114 describing the delete operation, the first content editing operation, and the second content editing operation before receiving edit data 114' describing the third content editing operation.

At T2 516, the client device 102 and the client device 102' receive the relay data 120 describing the third content editing operation. Since the indication 526 conflicts with the indication 520, the resolution module 108 performs a transaction inversion on the local transaction stack 510 and writes the indication 526 at a position of the local transaction stack 510 that is before the position of the indication 520 in the local transaction stack 510. For instance, the resolution module 108' identifies the indication 526 as a confirmation or an acknowledgement of the third content editing operation and does not modify the local data 112' or modifies the local data 112' to indicate that the third content editing operation is confirmed or acknowledged.

At T3 518, the client device 102 and the client device 102' receive relay data 120 describing the delete operation, the first content editing operation, and the second content editing operation. For example, the resolution module 108 identifies the indications 520, 522, 524 as a confirmation or an acknowledgement of the delete operation, the first content editing operation, and the second content editing operation and does not modify the local data 112 or modifies the local data 112 to indicate that the delete operation, the first content editing operation, and the second content editing operation are confirmed or acknowledged. Since the client device 102' has no unacknowledged content editing operations, the resolution module 108' writes the indications 520, 522, 524 at positions of the local transaction stack 510' that are after the position of the indication 526.

At T2' 516', the client device 102 and the client device 102' receive the relay data 120 describing the delete operation, the first content editing operation, and the second content editing operation. In an example, the resolution module 108 identifies the indications 520, 522, 524 as a confirmation or an acknowledgment of the delete operation, the first content editing operation, and the second content editing operation and does not modify the local data 112 or modifies the local data 112 to indicate that the delete operation, the first content editing operation, and the second content editing operation are confirmed or acknowledged. The resolution module 108' identifies the indication 520 as a conflict with the indication 526 and performs a transaction inversion on the local transaction stack 510' that writes the indication 520 to a position of the local transaction stack 510' that is before the position of the indication 526 in the local transaction stack 510' and marks the indication 526 invalid.

At T3' 518', the client device 102 and the client device 102' receive relay data 120 describing the third content editing operation. For instance, the resolution module 108 identifies the indication 526 as a normal update that is invalid and writes the indication 526 marked invalid at a position of the local transaction stack 510 that is after a position of the indication 524 in the local transaction stack 510. The resolution module 108' identifies the indication 526 as a confirmation of an invalid third content editing operation and writes the indications 522, 524 at positions of the local transaction stack 510' that are after the position of the indication 526 in the local transaction stack 510'.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 6:
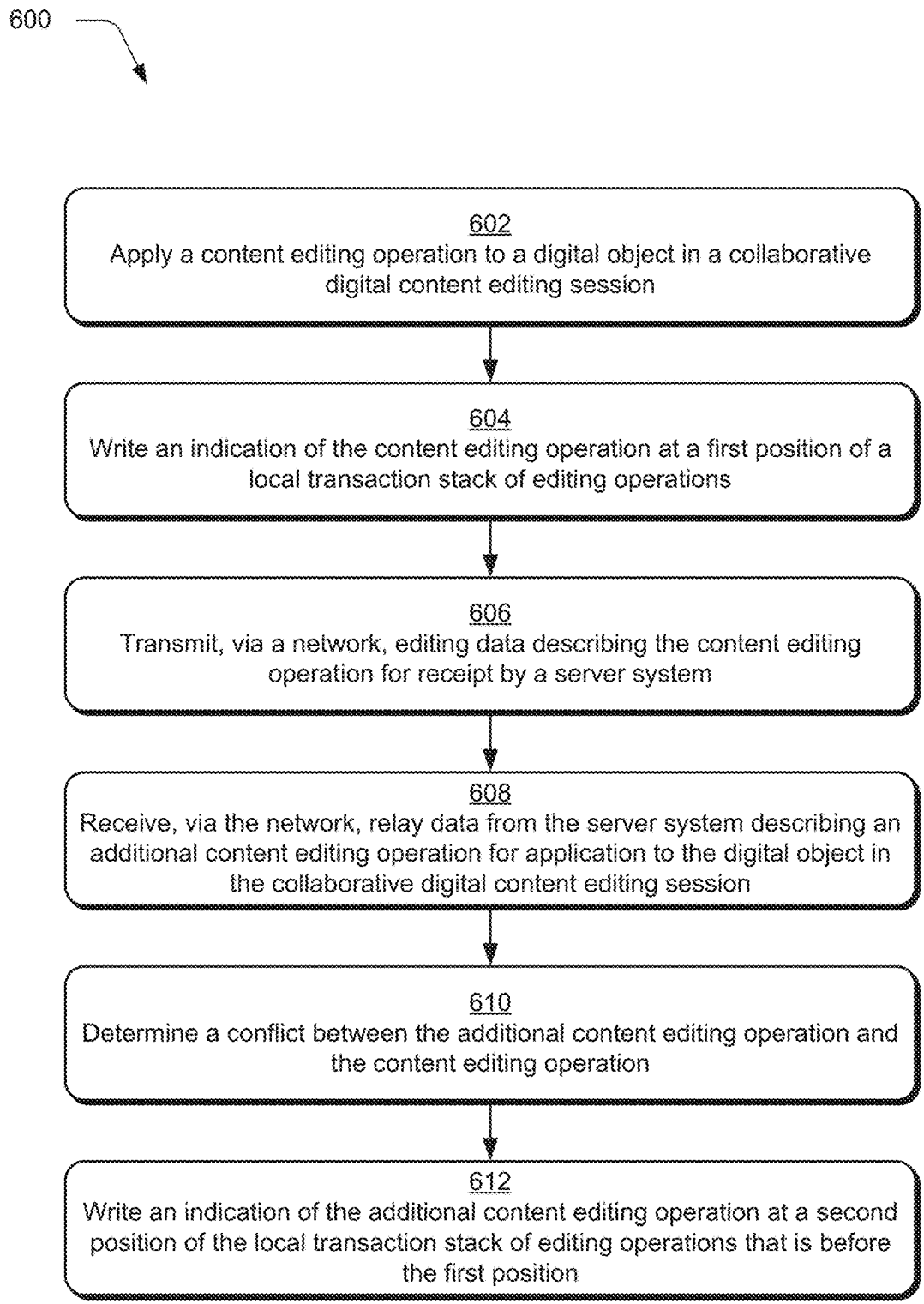
FIG. 6 is a flow diagram depicting a procedure in an example implementation in which a conflict between a content editing operation and an additional content editing operation is determined and an indication of the additional content editing operation is written at a position of a local transaction stack of editing operations that is before a most recent position of the local transaction stack of editing operations.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 6 is a flow diagram depicting a procedure 600 in an example implementation in which a conflict between a content editing operation and an additional content editing operation is determined and an indication of the additional content editing operation is written at a position of a local transaction stack of editing operations that is before a most recent position of the local transaction stack of editing operations.

A content editing operation is applied to a digital object in a collaborative digital content editing session (block 602). For example, the client device 102 implements the resolution module 108 to apply the content editing operation to the digital object.

An indication of the content editing operation is written at a first position of a local transaction stack of editing operations (block 604). In one example, the resolution module 108 writes the indication of the content editing operation at the first position of the local transaction stack of editing operations. Editing data describing the content editing operation is transmitted via a network for receipt by a server system (block 606). The client device 102 implements the resolution module 108 to transmit the editing data via the network in one example.

Relay data is received via the network from the server system describing an additional content editing operation for application to the digital object in the collaborative digital content editing session (block 608). In an example, the resolution module 108 receives the relay data via the network. A conflict is determined between the additional content editing operation and the content editing operation (block 610). For example, the resolution module 108 determines the conflict between the additional content editing operation and the content editing operation. An indication of the additional content editing operation is written at a second position of the local transaction stack of editing operations that is before the first position (block 612). The client device 102 implements the resolution module 108 to write the indication of the additional content editing operation at the second position that is before the first position in some examples.

Figure 7:
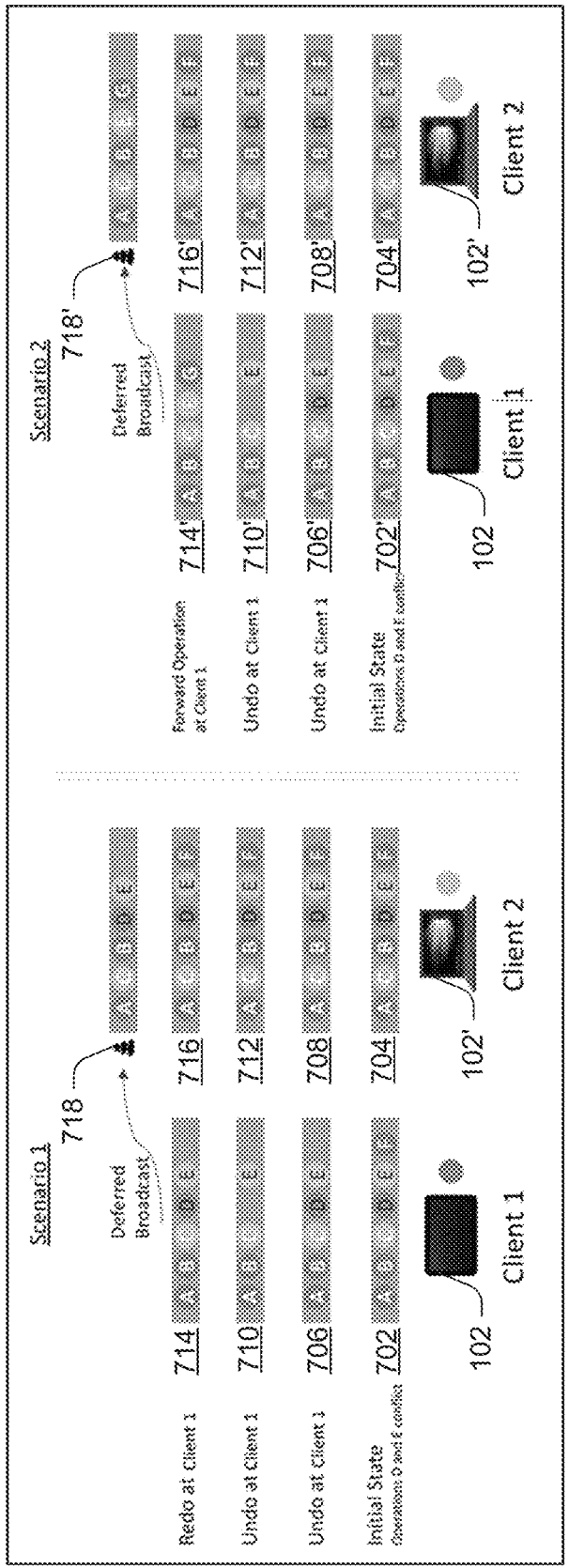
FIG. 7 illustrates an example representation of group undo/redo operations.

FIG. 7 illustrates an example representation 700 of group undo/redo operations. As shown, the representation 700 includes a client device 102 and a client device 102' in two scenarios in which the client device 102 performs undo/redo content editing operations after a global synchronization of six content editing operations A, B, C, D, E, and F. In both scenarios, the client device 102 performs content editing operations A, B, D, and F and the client device 102' performs content editing operations C and E. As illustrated in FIG. 7, content editing operations D and E are conflicting and a resolution module 108' of the client device 102' performs a transaction inversion to resolve this conflict.

In scenario one, a local transaction stack of the client device 102 has an initial state 702 and a local transaction stack of the client device 102' has an initial state 704. The client device 102 performs an undo operation for content editing operation F which causes the local transaction stack of the client device 102 to have a second state 706. The local transaction stack of the client device 102' also has a second state 708 which is the same as the initial state 704. The client device 102 also performs an undo operation for content editing operation D which causes the local transaction stack of the client device 102 to have a third state 710. As shown, the local transaction stack of the client device 102' also has a third state 712 which is the same as the second state 708 and the initial state 704.

After undoing the content editing operation D, the client device 102 performs a redo operation for the content editing operation D which causes the local transaction stack of the client device 102 to have a fourth state 714. The local transaction stack of the client device 102' also has a fourth state 716 which is the same as the initial state 704. As shown, the fourth state 714 is the same as the second state 706.

In some examples, a resolution module 108 of the client device 102 performs a deferred broadcast of undo and/or redo operations performed by the client device 102. In these examples, since it is common for the client device 102 to perform multiple undo and/or redo operations before the local transaction stack of the client device 102 reaches the fourth state 714, the resolution module 108 delays sending undo and/or redo operations performed by the client device 102 to the server system 116 via the network 104 by a threshold amount of time. Examples of the threshold amount of time include 200 milliseconds, 1 second, 30 seconds, 5 minutes, 30 minutes, an hour, 3 hours, 24 hours, and so forth. In an example, the threshold amount of time is a time included in a range of 25 milliseconds to 5 seconds. In other examples, the threshold amount of time is a time that is less than 45 milliseconds or greater than 5 seconds. For example, the threshold amount of time ensures that the local transaction stack of the client device 102 has reached the fourth state 714 before the undo and/or redo operations are transmitted to the server system 116. This results in the local transaction stack of the client device 102' having a fifth state 718.

In scenario two, the local transaction stacks of the client device 102 and the client device 102' have initial states of 702' and 704', respectively. Both the client device 102 and the client device 102' proceed as in scenario one with the client device 102 performing an undo operation for the content editing operation F which causes the local transaction stacks of the client device 102 and the client device 102' to have states 706' and 708', respectively. The client device 102 also performs the undo operation for the content editing operation D which causes the local transaction stacks of the client device 102 and the client device 102' to have states 710' and 712', respectively. However, instead of redoing the content editing operation D as in scenario one, the client device 102 performs a new local content editing operation G. As shown, this results in content editing operations D and F being lost and not recoverable. This also resolves the conflict between D and E such that no transaction inversion is performed by the resolution module 108' and causes the local transaction stack of the client device 102' to have state 718'.

Consider an example in which the resolution module 108 determines a top of the local transaction stack of the client device 102' and the resolution module 108' determines a top of the local transaction stack of the client device 102. In this example, if the client device 102 or client device 102' performs a local undo/redo operation, then action of the client device 102 or the client device 102' is only needed if no other content editing operation that is updating the same property of the same digital object is ahead of the property being undone or redone. This is because if there is a content operation afterwards that modified the same property, its effect is the latest and it is already visible on a display device of the client device 102 and/or the client device 102'.

Figure 8:
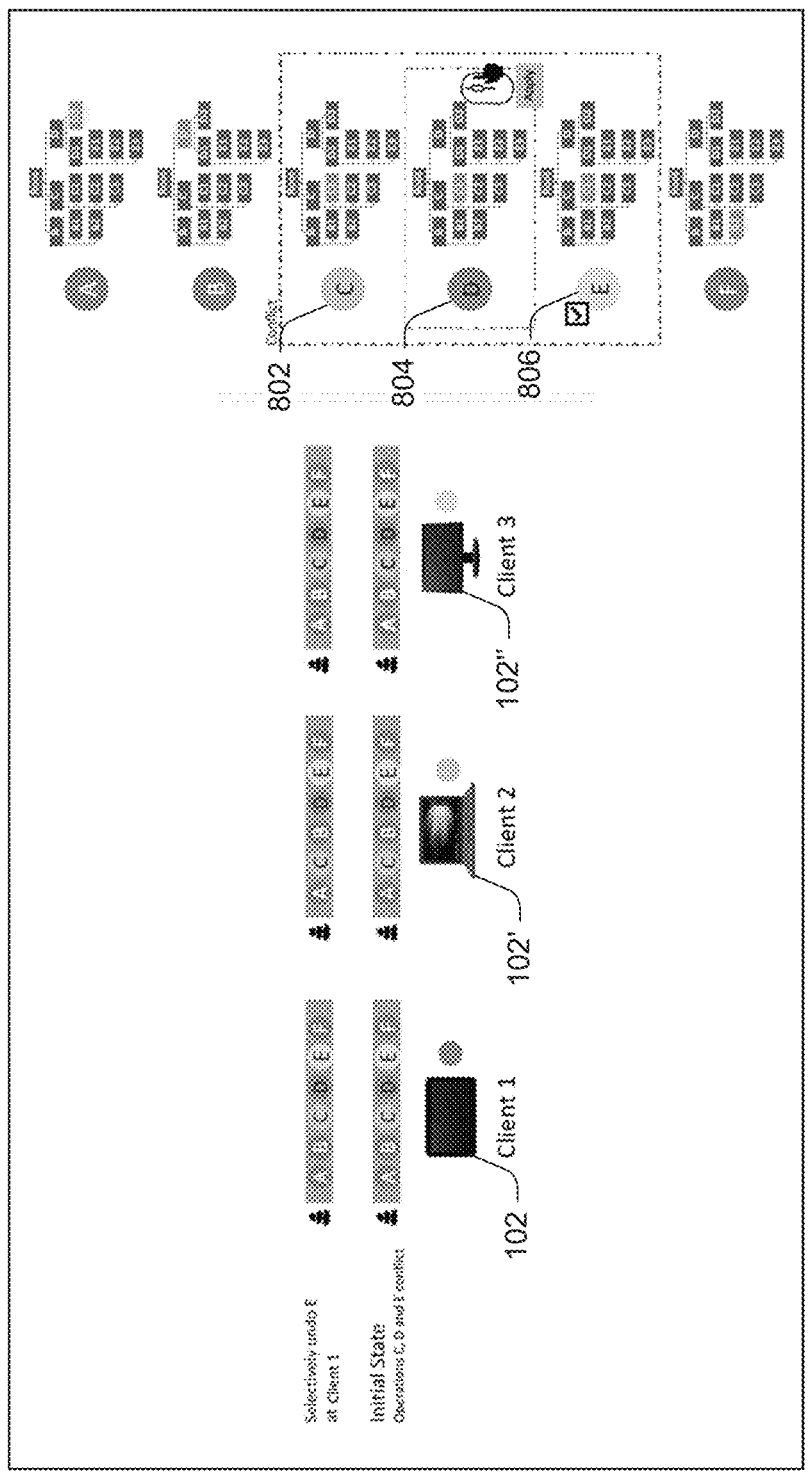
FIG. 8 illustrates an example representation of custom conflict resolution.

FIG. 8 illustrates an example representation 800 of custom conflict resolution. The representation 800 includes client device 102, client device 102', and client device 102" as well as representations of content editing operations A, B, C, D, E, and F. For instance, the client device 102 performs content editing operations A, B, D, and F. The client device 102' performs content editing operation C and the client device 102" performs content editing operation E. In the illustrated example, there is a three-way conflict between content editing operations C 802, D 804, and E 806.

For example, a resolution module 108 of the client device 102 transmits edit data 114 describing the content editing operation D 804 to a server system 116 via a network 104; a resolution module 108' of the client device 102' transmits edit data 114' describing the content editing operation C 802 to the server system 116 via the network 104, and a resolution module 108" of the client device 102" transmits edit data 114" describing the content editing operation E 806 to the server system 116 via the network 104. In a first example, the server system 116 identifies the edit data 114" as being received by the server system 116 after the edit data 114 and the edit data 114'. In this first example, a default resolution to the three-way conflict selects the content editing operation E 806 based on a causal or temporal order in which the server system 116 receives the edit data 114, the edit data 114', and the edit data 114".

In a second example, the client device 102 selects the content editing operation D 804 and the three-way conflict is resolved in favor of the content editing operation D 804. In this example, the client device 102 generates edit data 114 describing the selection of the content editing operation D 804 for resolving the three-way conflict and transmits the edit data 114 to the server system 116 via the network 104. In response to receiving the edit data 114, the server system 116 generates relay data 120 describing the selection of the content editing operation D 804 to resolve the three-way conflict. The client device 102' and the client device 102" receive the relay data 120 and process the relay data 120 to identify the content editing operation D 804 as being selected to resolve the three-way conflict.

In a third example, the three-way conflict between the editing operations C 802, D 804, and E 806 is resolved according to a rule-based conflict resolution system. For example, rules of the rule-based conflict resolution system are ownership based, operation based, etc. Ownership based rules define the client device 102, the client device 102', or the client device 102" as an owner of a shared electronic document, an owner of a digital artboard included in the shared electronic document, an owner of a layer of the shared electronic document, or an owner of a granular structure within the shared electronic document such as an owner of an object included as part of the shared electronic document. For instance, in the second example, the client device 102 is defined as an owner of a portion of a shared electronic document which is the subject of the content editing operations C 802, D 804, and E 806.

Selection of owners in ownership-based conflict resolution systems is accomplished in a variety of different ways. In a first example, owners are determined based on agreement such as by agreement between users of the client devices 102, 102', and 102". In a second example, owners are determined in substantially real time, e.g., as conflicts among content editing operations are identified, based on independence from the conflicts, types of identified conflicts, temporal availability to resolve the conflicts, and so forth. In operation-based conflict resolution systems, color owners are established, inter-object placement owners are established, object geometry owners are established, etc.

Rules of the rule-based conflict resolution system are executed locally by the client devices 102, 102', and 102", for example, over pairs of the content editing operations C 802, D 804, and E 806. Results of executing the rules are auto-selected as a default resolution to a conflict. Accordingly, even though the rules are executed locally by the client devices 102, 102', and 102", an auto-selected default resolution to a conflict is consistent across all of the client devices 102, 102', and 102". For example, the client devices 102, 102', and 102" store two bitflags per content editing operation (e.g., as part of the local data 112, 112', and 112" or separately). In this example, one of the two bitflags indicates whether a particular content editing operation conflicts with a preceding or succeeding content editing operation and the other of the two bitflags indicates whether the particular content editing operation is selected for resolving an indicated conflict.

The resolution modules 108, 108', and 108" also support passive collaboration among the client devices 102, 102', and 102" in which the client devices 102, 102', 102" temporarily stop transmitting edit data 114, 114', and 114" to the server system 116 via the network 104. Consider an example of passive collaboration in which the client device 102 temporarily stops transmission of the edit data 114 describing content editing operations performed locally on a local version of digital content by the client device 102 to the server system 116. After performing multiple content editing operations on the local version of the digital content, the client device 102 then transmits edit data 114 describing the multiple content editing operations to the server system 116 via the network 104.

In this example, the client device 102 continues to receive relay data 120 describing content editing operations performed in the collaborative digital content editing session or the client device 102 also stops receiving the relay data 120 during the passive collaboration. If the client device 102 continues to receive the relay data 120 during the passive collaboration, then the resolution module 108 writes indications of content editing operations described by the relay data 120 before indications of the multiple content editing operations performed locally in a local transaction stack described by the local data 112. If the client device 102 does not continue to receive the relay data 120 during the passive collaboration, then upon receipt of the relay data 120 after the passive collaboration, the resolution module 108 applies content editing operations described by the relay data 120 first and then applies the multiple content editing operations performed locally to the local version of the digital content. Conflicts between content editing operations performed during the passive collaboration are resolvable in accordance with the examples described with respect to FIGS. 3A, 3B, 4A, 4B, 5A, and 5B.

Example System and Device

Figure 9:
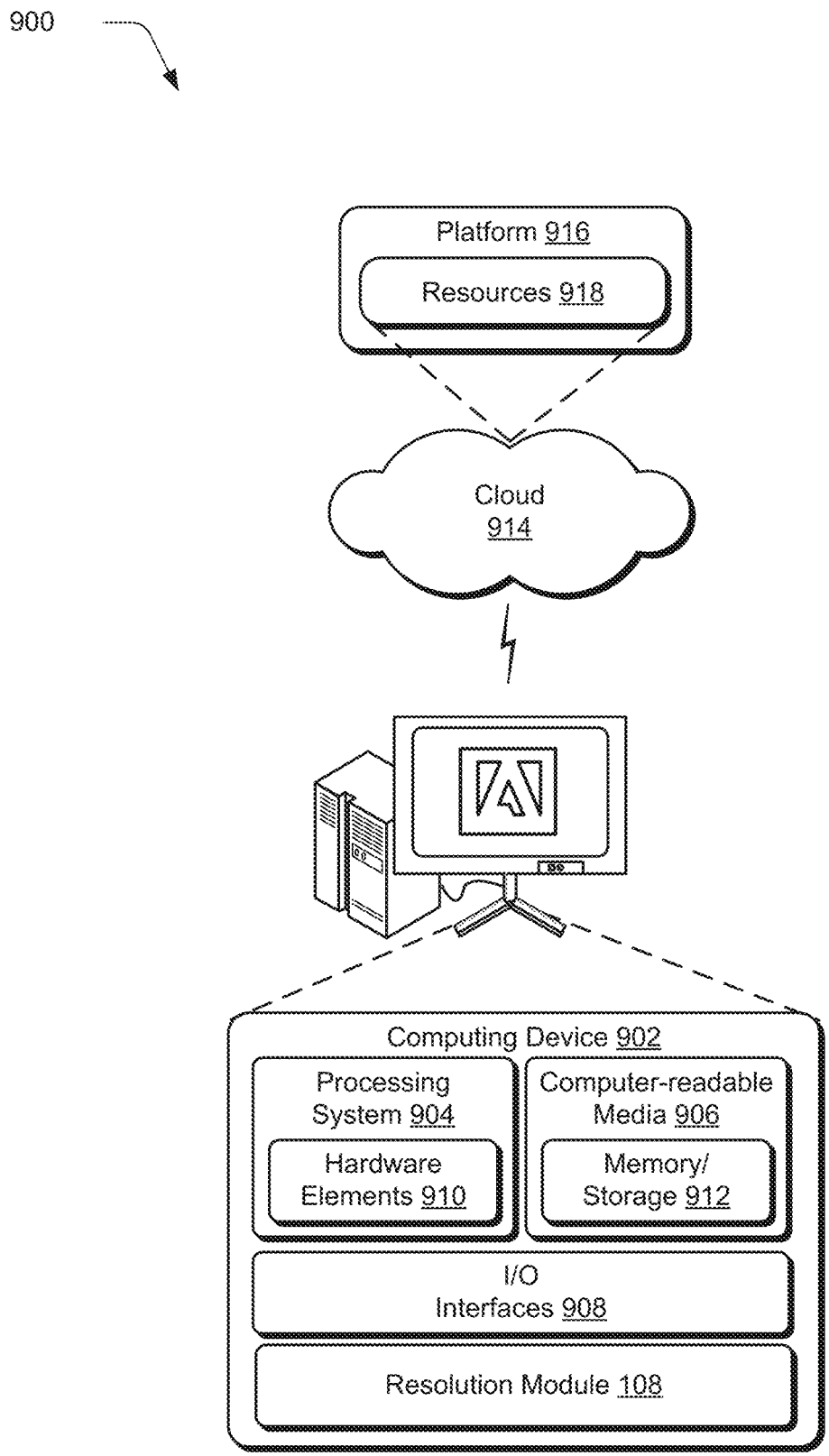
FIG. 9 illustrates an example system that includes an example computing device that is representative of one.

FIG. 9 illustrates an example system 900 that includes an example computing device that is representative of one or more computing systems and/or devices that are usable to implement the various techniques described herein. This is illustrated through inclusion of the resolution module 108. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although implementations of systems for resolving conflicts in collaborative digital content editing have been described in language specific to structural features and/or methods, it is to be understood that the appended claims are not necessarily limited to the specific features or methods described. Rather, the specific features and methods are disclosed as example implementations of systems for resolving conflicts in collaborative digital content editing, and other equivalent features and methods are intended to be within the scope of the appended claims. Further, various different examples are described and it is to be appreciated that each described example is implementable independently or in connection with one or more other described examples.

What is claimed is:

1. A method comprising:
    receiving, by a processing device of a collaboration server via a network, input data from a first client device describing a content editing operation to a digital object;
    writing, by the processing device, an indication of the content editing operation at a most recent position of a stack of editing operations of the collaboration server;
    receiving, by the processing device via the network, additional input data from a second client device;
    determining, by the processing device, that the additional input data describes a conflicting content editing operation to the digital object and that the conflicting content editing operation occurs before the processing device receives the input data based on a time of the conflicting content editing operation received from the second client device;
    transmitting, by the processing device via the network and in response to determining the conflicting content editing operation occurs before the processing device receives the input data, relay data from the collaboration server to the first client device and the second client device including instructions configured to:
        cause the first client device and the second client device to perform an editing operation to undo the content editing operation; and
        cause the first client device and the second client device to perform the conflicting content editing operation;
    writing, by the processing device, an indication of the conflicting content editing operation at a position of the stack of editing operations that is before the most recent position; and
    writing, by the processing device, an edit to the indication of the content editing operation that identifies the editing operation to undo the content editing operation.

2. The method of claim 1, wherein the editing operation to undo the content editing operation includes determining whether the conflicting content editing operation is invalid.

3. The method of claim 1, wherein the processing device transmits the relay data in an order that the input data and the additional input data is received by the processing device.

4. The method of claim 1, wherein the digital object is included in an electronic document that is being edited as part of a collaborative digital content editing session.

5. The method of claim 1, wherein the relay data is further configured to cause a redo operation after performing the editing operation to undo the content editing operation.

6. The method of claim 1, wherein the processing device applies content editing operations to a version of an electronic document that is being edited.

7. The method of claim 1, further comprising generating additional relay data describing the indication of the conflicting content editing operation and transmitting the additional relay data describing the indication of the conflicting content editing operation via the network for receipt by computing devices included in a collaborative digital content editing session.

8. The method of claim 7, further comprising processing the additional relay data describing the indication of the conflicting content editing operation to identify a confirmation of the content editing operation.

9. The method of claim 1, further comprising maintaining a record of editing operations performed without modifying local data.

10. The method of claim 1, wherein the relay data identifies a temporal order of the content editing operation and the conflicting content editing operation.

11. A system comprising:
    a memory component; and
    a processing device of a collaboration server coupled to the memory component, the processing device to perform operations comprising:
        receiving, via a network, input data from a first client device describing a content editing operation to a digital object;
        writing an indication of the content editing operation at a most recent position of a stack of editing operations of the collaboration server;
        receiving, via the network, additional input data from a second client device;
        determining that the additional input data describes a conflicting content editing operation to the digital object and that the conflicting content editing operation occurs after the processing device receives the input data based on a time of the conflicting content editing operation received from the second client device;
        transmitting, via the network and in response to determining the conflicting content editing operation occurs after the processing device receives the input data, relay data from the collaboration server to the first client device and the second client device including instructions configured to:

cause the first client device and the second client device to perform an editing operation to undo the conflicting content editing operation; and cause the first client device and the second client device to perform the content editing operation;

writing an indication of the conflicting content editing operation at a position of the stack of editing operations that is after the most recent position; and writing an edit to the indication of the content editing operation that identifies the editing operation to undo the conflicting content editing operation.

12. The system of claim 11, wherein the processing device transmits the relay data in an order that the input data and the additional input data is received by the processing device.

13. The system of claim 11, wherein the digital object is included in an electronic document that is being edited as part of a collaborative digital content editing session.

14. The system of claim 11, wherein the relay data is further configured to cause a redo operation after performing the editing operation to undo the conflicting content editing operation.

15. The system of claim 11, wherein the processing device applies content editing operations to a version of an electronic document that is being edited.

16. The system of claim 11, further comprising generating additional relay data describing the indication of the conflicting content editing operation and transmitting the additional relay data describing the indication of the conflicting content editing operation via the network for receipt by computing devices included in a collaborative digital content editing session.

17. A non-transitory computer-readable storage medium storing executable instructions, which when executed by a processing device of a collaboration server, cause the processing device to perform operations comprising:

receiving, via a network, input data from a first client device describing a content editing operation to a digital object;

writing an indication of the content editing operation at a most recent position of a stack of editing operations of the collaboration server;

receiving, via the network, additional input data from a second client device;

determining that the additional input data describes a conflicting content editing operation to the digital object and that the conflicting content editing operation occurs before the processing device receives the input data based on a time of the conflicting content editing operation received from the second client device;

transmitting, via the network and in response to determining the conflicting content editing operation occurs before the processing device receives the input data, relay data from the collaboration server to the first client device and the second client device including instructions configured to:

cause the first client device and the second client device to perform an editing operation to undo the content editing operation; and cause the first client device and the second client device to perform the conflicting content editing operation;

writing an indication of the conflicting content editing operation at a position of the stack of editing operations that is before the most recent position; and writing an edit to the indication of the content editing operation that identifies the editing operation to undo the content editing operation.

18. The non-transitory computer-readable storage medium of claim 17, wherein the processing device transmits the relay data in an order that the input data and the additional input data is received by the processing device.

19. The non-transitory computer-readable storage medium of claim 17, wherein the digital object is included in an electronic document that is being edited as part of a collaborative digital content editing session.

20. The non-transitory computer-readable storage medium of claim 17, further comprising maintaining a record of editing operations performed without modifying local data.

* * * * *